US008877862B2

(12) United States Patent
Alidedeoglu et al.

(10) Patent No.: US 8,877,862 B2
(45) Date of Patent: Nov. 4, 2014

(54) METHOD FOR COLOR STABILIZATION OF POLY(BUTYLENE-CO-ADIPATE TEREPHTHALATE

(75) Inventors: Husnu Alp Alidedeoglu, Evansville, IN (US); Ganesh Kannan, Evansville, IN (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/183,807

(22) Filed: Jul. 15, 2011

(65) Prior Publication Data

US 2013/0018142 A1  Jan. 17, 2013

(51) Int. Cl.
*C08G 63/60* (2006.01)
*C08L 67/02* (2006.01)
*C08G 63/183* (2006.01)
*C08G 63/20* (2006.01)
*C08J 11/24* (2006.01)

(52) U.S. Cl.
CPC .............. *C08G 63/183* (2013.01); *C08L 67/02* (2013.01); *C08J 2367/02* (2013.01); *C08G 63/20* (2013.01); *C08J 11/24* (2013.01)
USPC ........... 524/605; 523/128; 523/124; 523/500; 525/64; 525/340

(58) Field of Classification Search
USPC ....................................................... 523/500
See application file for complete search history.

(56) References Cited

U.S. PATENT DOCUMENTS

| | | |
|---|---|---|
| 2,012,267 A | 8/1929 | Carothers |
| 2,780,609 A | 2/1957 | Petropoulos |
| 2,830,966 A | 4/1958 | Petropoulos |
| 2,873,262 A | 2/1959 | Petropoulos |
| 3,102,135 A | 8/1963 | Petropoulos et al. |
| 3,522,215 A | 7/1970 | Sardessai et al. |
| 3,535,286 A | 10/1970 | Stow et al. |
| 3,547,888 A | 12/1970 | Sardessai et al. |
| 3,634,089 A | 1/1972 | Hamb |
| 3,669,921 A | 6/1972 | Droke et al. |
| 3,769,264 A | 10/1973 | Wilson et al. |
| 3,833,685 A | 9/1974 | Wambach |
| 3,856,752 A | 12/1974 | Bateman et al. |
| 3,951,886 A | 4/1976 | Miyake et al. |
| 3,953,539 A | 4/1976 | Kawase et al. |
| 3,989,664 A | 11/1976 | Kawase et al. |
| 4,128,526 A | 12/1978 | Borman |
| 4,178,277 A | 12/1979 | Gebauer et al. |
| 4,328,059 A | 5/1982 | Horlbeck et al. |
| 4,401,804 A | 8/1983 | Wooten et al. |
| 4,452,933 A | 6/1984 | McCready |
| 4,482,700 A | 11/1984 | Kuhnrich et al. |
| 4,500,575 A | 2/1985 | Taira et al. |
| 4,617,373 A | 10/1986 | Pruett et al. |
| 4,659,615 A | 4/1987 | Ishii et al. |
| 5,266,601 A | 11/1993 | Kyber et al. |
| 5,268,420 A | 12/1993 | Nishimura et al. |
| 5,271,985 A | 12/1993 | Tsunashima et al. |
| 5,378,796 A | 1/1995 | George et al. |
| 5,391,263 A | 2/1995 | Hepner et al. |
| 5,391,362 A | 2/1995 | Reinalda et al. |
| 5,413,681 A | 5/1995 | Tustin et al. |
| 5,446,079 A | 8/1995 | Buchanan et al. |
| 5,451,611 A | 9/1995 | Chilukuri et al. |
| 5,453,479 A | 9/1995 | Borman et al. |
| 5,466,777 A | 11/1995 | Caruso et al. |
| 5,498,749 A | 3/1996 | Heise et al. |
| 5,554,657 A | 9/1996 | Brownscombe et al. |
| 5,559,159 A | 9/1996 | Sublett et al. |
| 5,744,503 A | 4/1998 | Smith et al. |
| 5,817,721 A | 10/1998 | Warzelhan et al. |
| 5,844,023 A | 12/1998 | Tomka |
| 5,866,710 A | 2/1999 | Ridland et al. |
| 5,869,543 A | 2/1999 | Boos et al. |
| 6,020,393 A | 2/2000 | Khemani |
| 6,066,714 A | 5/2000 | Putzig et al. |
| 6,096,809 A | 8/2000 | Lorcks et al. |
| 6,120,895 A | 9/2000 | Kowitz et al. |
| 6,133,404 A | 10/2000 | Kang et al. |
| 6,166,170 A | 12/2000 | Putzig |
| 6,201,034 B1 | 3/2001 | Warzelhan et al. |
| 6,231,970 B1 | 5/2001 | Andersen et al. |
| 6,235,815 B1 | 5/2001 | Loercks et al. |
| 6,303,738 B1 | 10/2001 | Putzig et al. |
| 6,383,729 B1 | 5/2002 | Ohnuma et al. |
| 6,384,129 B1 | 5/2002 | Lowry |
| 6,472,497 B2 | 10/2002 | Loercks et al. |
| 6,472,557 B1 | 10/2002 | Pell, Jr. et al. |

(Continued)

FOREIGN PATENT DOCUMENTS

| | | |
|---|---|---|
| EP | 103531 B1 | 3/1984 |
| EP | 0331746 B1 | 6/1984 |
| EP | 0272417 A2 | 6/1988 |
| EP | 0573680 A1 | 12/1993 |
| EP | 0634435 A1 | 1/1995 |
| EP | 0736557 A1 | 10/1996 |
| EP | 0575349 B2 | 8/2003 |
| EP | 1344765 A1 | 9/2003 |
| EP | 1426404 A1 | 6/2004 |
| EP | 1437377 A1 | 7/2004 |

(Continued)

OTHER PUBLICATIONS

JP60147430 Abstract; 1 page; Aug. 3, 1985.
U.S. Appl. No. 13/032,051, filed Feb. 22, 2011.
U.S. Appl. No. 13/032,091, filed Feb. 22, 2011.
U.S. Appl. No. 13/032,121, filed Feb. 22, 2011.
U.S. Appl. No. 13/183,786, filed Jul. 15, 2011.

(Continued)

*Primary Examiner* — Susannah Chung
*Assistant Examiner* — Robert T Butcher
(74) *Attorney, Agent, or Firm* — Cantor Colburn LLP; Diderico van Eyl

(57) ABSTRACT

Biodegradable compositions containing an aliphatic-aromatic copolyester derived from aromatic polyesters. Methods of making the compositions and articles made from the compositions.

22 Claims, No Drawings

(56) References Cited

U.S. PATENT DOCUMENTS

| | | |
|---|---|---|
| 6,518,322 B1 | 2/2003 | West |
| 6,521,717 B1 | 2/2003 | Itoh |
| 6,573,340 B1 | 6/2003 | Khemani et al. |
| 6,582,818 B2 | 6/2003 | Haile et al. |
| 6,649,731 B2 | 11/2003 | Hori et al. |
| 6,660,211 B2 | 12/2003 | Topolkaraev et al. |
| 6,703,115 B2 | 3/2004 | Hale et al. |
| 6,706,843 B1 | 3/2004 | Ishihara et al. |
| 6,713,595 B2 | 3/2004 | Chung et al. |
| 6,803,389 B2 | 10/2004 | Kawamura et al. |
| 6,841,597 B2 | 1/2005 | Bastioli et al. |
| 6,998,462 B2 | 2/2006 | Duan et al. |
| 7,037,959 B1 | 5/2006 | Willett et al. |
| 7,129,301 B2 | 10/2006 | Wu et al. |
| 7,160,977 B2 | 1/2007 | Hale et al. |
| 7,166,690 B2 | 1/2007 | Kim |
| 7,176,251 B1 | 2/2007 | Bastioli et al. |
| 7,241,832 B2 | 7/2007 | Khemani et al. |
| 7,241,838 B2 | 7/2007 | Shelby et al. |
| 7,354,653 B2 | 4/2008 | Germroth et al. |
| 7,368,503 B2 | 5/2008 | Hale |
| 7,368,511 B2 | 5/2008 | Hale et al. |
| 7,737,246 B2 | 6/2010 | Crawford |
| 7,799,836 B2 | 9/2010 | Agarwal et al. |
| 7,910,645 B2 | 3/2011 | Ahmed et al. |
| 8,038,658 B2 | 10/2011 | Kohama |
| 8,088,834 B2 | 1/2012 | Agarwal et al. |
| 2001/0014388 A1 | 8/2001 | Bastioli et al. |
| 2002/0111409 A1 | 8/2002 | Talibuddin |
| 2004/0092672 A1 | 5/2004 | Bastioli et al. |
| 2004/0254330 A1 | 12/2004 | Duan et al. |
| 2005/0113534 A1 | 5/2005 | Agarwal et al. |
| 2005/0137304 A1 | 6/2005 | Strand et al. |
| 2006/0004151 A1 | 1/2006 | Shaikh et al. |
| 2006/0257676 A1 | 11/2006 | Itada et al. |
| 2007/0010648 A1 | 1/2007 | Partridge et al. |
| 2007/0066794 A1 | 3/2007 | Jernigan |
| 2007/0079945 A1 | 4/2007 | Noda et al. |
| 2007/0082573 A1 | 4/2007 | Noda et al. |
| 2007/0082981 A1 | 4/2007 | Noda et al. |
| 2007/0093634 A1 | 4/2007 | Salsman et al. |
| 2007/0208160 A1 | 9/2007 | Agarwal et al. |
| 2007/0240075 A1* | 10/2007 | Jesberger et al. ............ 715/772 |
| 2007/0241483 A1 | 10/2007 | Bastioli et al. |
| 2007/0244242 A1 | 10/2007 | Agarwal et al. |
| 2007/0264460 A1 | 11/2007 | Del Tredici |
| 2007/0275242 A1 | 11/2007 | Gopal et al. |
| 2007/0276069 A1 | 11/2007 | Agarwal et al. |
| 2008/0039571 A1 | 2/2008 | Cohoon et al. |
| 2008/0274320 A1 | 11/2008 | Yokoyama et al. |
| 2008/0311385 A1 | 12/2008 | Miyazaki et al. |
| 2009/0169772 A1 | 7/2009 | Yamada et al. |
| 2009/0274885 A1 | 11/2009 | Egawa |
| 2009/0275698 A1 | 11/2009 | Ravi et al. |
| 2010/0041831 A1 | 2/2010 | Chung et al. |
| 2010/0168317 A1 | 7/2010 | Cahoon-Brister |
| 2010/0168336 A1 | 7/2010 | Cohoon-Brister |
| 2010/0168371 A1 | 7/2010 | Berti et al. |
| 2011/0071235 A1* | 3/2011 | Kannan et al. ............... 523/128 |
| 2011/0120346 A1 | 5/2011 | Reisacher et al. |
| 2011/0178265 A1* | 7/2011 | Tanaka et al. ............... 528/272 |
| 2012/0232191 A1 | 9/2012 | Auffermann et al. |
| 2013/0030116 A1 | 1/2013 | Okaniwa et al. |

FOREIGN PATENT DOCUMENTS

| | | |
|---|---|---|
| EP | 1473324 A1 | 11/2004 |
| EP | 1627893 A1 | 2/2006 |
| EP | 0950678 A1 | 12/2006 |
| EP | 1862507 A1 | 12/2007 |
| EP | 2003159 A1 | 12/2008 |
| EP | 2042548 A1 | 4/2009 |
| EP | 1947145 A2 | 12/2009 |
| GB | 1507358 | 4/1978 |
| GB | 2101617 A | 1/1983 |
| WO | 0185824 A2 | 11/2001 |
| WO | 2007076384 A2 | 7/2007 |
| WO | 2007089598 A1 | 8/2007 |
| WO | 2007089600 A1 | 8/2007 |
| WO | 2008042384 A1 | 4/2008 |
| WO | 2008085396 A1 | 7/2008 |
| WO | 2010034711 A1 | 4/2010 |
| WO | WO 2010035591 A1 * | 4/2010 |
| WO | 2010077809 A1 | 7/2010 |
| WO | 2013012706 A1 | 1/2013 |
| WO | 2013012707 A1 | 1/2013 |
| WO | 2013033285 A1 | 3/2013 |

OTHER PUBLICATIONS

U.S. Appl. No. 13/183,821, filed Jul. 15, 2011.
U.S. Appl. No. 13/221,159, filed Aug. 30, 2011.
U.S. Appl. No. 13/397,189, filed Feb. 15, 2012.
U.S. Appl. No. 13/397,200, filed Feb. 15, 2012.
U.S. Appl. No. 13/397,210, filed Feb. 15, 2012.
JP59138222A with English Abstract; Date of Publication Aug. 8, 1984; 7 pages.
JP9087370A with English Abstract; Date of Publication Mar. 31, 1997; 6 pages.
U.S. Appl. No. 13/409,898, filed Mar. 1, 2012.
U.S. Appl. No. 13/409,983, filed Mar. 1, 2012.
U.S. Appl. No. 13/432,638, filed Mar. 29, 2012.
U.S. Appl. No. 13/433,390, filed Mar. 29, 2012.
U.S. Appl. No. 13/435,865, filed Mar. 30, 2012.
Chang et al.; "Copolyesters. VII. Thermal Transitions of Poly(butylene terephthalate-co-isophthalate-co-adipate)s"; vol. 51; Issue 6; Feb. 1994; pp. 999-1004.
English Abstract of EP0007445 A1; Date of Publication Feb. 6, 1980; 1 page.
English Abstract of EP0519367 A1; Date of Publication Sep. 2, 1998; 2 pages.
English Abstract of EP2258545 A1; Date of Publication Dec. 8, 2010; 2 pages.
English Abstract of JP2000109665 A; Date of Publication Apr. 18, 2000; 1 page.
English Abstract of JP2003220645 A; Date of Publication Aug. 5, 2003; 1 page.
English Abstract of JP2004050769 A; Date of Publication Feb. 19, 2004; 1 page.
English Abstract of JP2004098321 A; Date of Publication Apr. 2, 2004; 2 pages.
English Abstract of JP2004204038 A; Date of Publication; 1 page.
English Abstract of JP2005052479 A; Date of Publication Mar. 3, 2005; 2 pages.
English Abstract JP2005220278 A; Aug. 18, 2005; 1 page.
English Abstract JP2008045117 A; Date of Publication Feb. 28, 2008; 2 pages.
English Abstract of JP3776578 B2; Date of Publication May 17, 2006; 1 page.
International Search Report for International Application No. PCT/JP2009/064418; International Date of Publication Nov. 10, 2009; Date of Mailing Nov. 17, 2009; 2 pages.
International Search Report for International Application No. PCT/US2012/026046; Date Mailed May 18, 2012; 5 pages.
Written Opinion of the International Search Report for International Application No. PCT/US2012/026046; Date of Mailing May 18, 2012; 8 pages.
International Search Report for International Application No. PCT/US2012/026048; Date Mailed May 18, 2012; 5 pages.
Written Opinion for International Application No. PCT/US2012/026048; Date Mailed May 18, 2012; 8 pages.
International Search Report for International Application PCT/US2012/026051; International Filing Date Feb. 22, 2012; Date of Mailing Aug. 3, 2012; 5 pages.
Written Opinion of the International Search Report for PCT/US2012/026051; International Filing Date Feb. 22, 2012; Date of Mailing Aug. 3, 2012; 9 pages.

(56) References Cited

OTHER PUBLICATIONS

Ukielski et al.; "Effect of Chemical Modification of Poly(butylene terephthalate) on elastic properties"; International Polymer Science and Technology, vol. 31, No. 3; Jan. 2004; 6 pages.
Witt et al.; "New Biodegradable Polyester-Copolymers from Commodity Chemicals with Favorable Use Properties"; Journal of Environmental Polymer Degradation; vol. 3; No. 4; no month, 1995; pp. 215-223.
Machine Translation of JP2004098321; Apr. 2004; 6 pages.
Kleeberg et al.; "Biodegradation of Aliphatic-Aromatic copolyesters by *Thermomonospora fusca* and Other Thermophilic Compost Isolates"; Applied and Environmental Microbiology; vol. 64, No. 5; 1998, American Society for Microbiology; pp. 1731-1735.
International Search Report for International Patent Application No. PCT/US2012/068913; International Filing Date Dec. 11, 2012; Date of Mailing Mar. 25, 2013; 5 pages.
International Search Report of International Patent Application No. PCT/US2012/068907; International Date of Filing Dec. 11, 2012; Date of Mailing Mar. 25, 2013; 5 pages.
Written Opinion of the International Search Report for International Patent Application No. PCT/US2012/068907; International Date of Filing Dec. 11, 2012; Date of Mailing Mar. 25, 2013; 8 pages.
International Search Report of International Patent Application No. PCT/US2012/068909; International Filing Date Dec. 11, 2012; Date of Mailing Mar. 21, 2013; 5 pages.
Written Opinion of the International Search Report for International Patent Application No. PCT/US2012/068909; International Filing Date Dec. 11, 2012; Date of Mailing Mar. 21, 2013; 7 pages.
Written Opinion of the International Search Report for International Patent Application PCT/US2012/068913; International Date of Filing Dec. 11, 2012; Date of Mailing Mar. 25, 2013; 8 pages.
International Search Report for International Application No. PCT/US2012/046625; International Filing Date Jul. 13, 2012; Date of Mailing Dec. 20, 2012; 4 pages.
Written Opinion of the International Search Report for International Application No. PCT/US2012/046625; International Filing Date Jul. 13, 2012; Date of Mailing Dec. 20, 2012; 6 pages.
International Search Report for International Application No. PCT/US2012/046627; International Filing Date Jul. 13, 2012; Date of Mailing Dec. 12, 2012.
Written Opinion of the International Search Report for International Application No. PCT/US2012/046627; International Filing Date Jul. 13, 2012; Date of Mailing Dec. 12, 2012.
International Search Report for International Application No. PCT/US2012/046629; International Filing Date Jul. 13, 2012; Date of Mailing Dec. 20, 2012; 4 pages.
Written Opinion of the International Search Report for International Application No. PCT/US2012/046629; International Filing Date Jul. 13, 2012; Date of Mailing Dec. 20, 2012; 6 pages.
International Search Report for International Patent Application No. PCT/US2012/052971; International Filing Date Aug. 30, 2012; Date of Mailing Dec. 10, 2012; 5 pages.
Written Opinion of the International Search Report for International Patent Application No. PCT/US2012/052971; International Filing Date Aug. 30, 2012; Date of Mailing Dec. 10, 2012; 7 pages.
JP19840003496 English Abstract; Date of Publication Aug. 3, 1985; 2 pages.
International Search Report for International Application No. PCT/US2012/071902; International Filing Date: Dec. 28, 2012; Date of Mailing Jun. 24, 2013; 5 pages.
Written Opinion of the International Search Report for International Application No. PCT/US2012/071902; International Filing Date: Dec. 28, 2012; Date of Mailing Jun. 24, 2013; 7 pages.
International Search Report for International Application No. PCT/US2012/071904; International Filing Date Dec. 28, 2012; Date of Mailing Jun. 24, 2013; 5 pages.
Written Opinion of the International Search Report for International Application No. PCT/US2012/071904; International Filing Date Dec. 28, 2012; Date of Mailing Jun. 24, 2013; 6 pages.
International Search Report for International Application No. PCT/US2012/071908; International Date of Filing Dec. 28, 2012; Date of Mailing May 7, 2013; 5 pages.
Written Opinion of the International Search Report for International Application No. PCT/US2012/071908; International Date of Filing Dec. 28, 2012; Date of Mailing May 7, 2013; 8 pages.
WO 2009127556 A1 English Abstract; Date of Publication Oct. 22, 2009; 2 pages.
WO 2011054786 A1 English Abstract; Date of Publication May 12, 2011; 1 page.
DE 19638488 A1 English Abstract; Date of Publication Mar. 26, 1998 2 pages.
Patent Cooperation Treaty, International Bureau, Preliminary Report on Patentability and Written Opinion, PCT/US2012/046625, Date of mailing: Jan. 30, 2014, 7 pages.
Patent Cooperation Treaty; International Preliminary Report on Patentability; PCT/US2012/052971; Date of mailing: Mar. 13, 2014, 7 pages.
Scheirs et al.; "Modern Polyesters: Chemistry and Technology of Polyesters and Copolyesters"; 2003; pp. 293-321.

\* cited by examiner

METHOD FOR COLOR STABILIZATION OF POLY(BUTYLENE-CO-ADIPATE TEREPHTHALATE

BACKGROUND

This disclosure relates to an aliphatic-aromatic copolyester of poly(butylene-co-adipate terephthalate) from polyethylene terephthalate, compositions and articles containing the copolyester, and a process for preparing the copolyester.

Thermoplastic molding compositions based on polybutylene terephthalate (PBT) are used in various applications. Although useful to many customers, conventional PBT molding compositions generally cannot be made from recycled sources of PBT due to the lack of availability of large post-consumer or post-industrial supplies of PBT scrap materials. Polyethylene terephthalate (PET), unlike PBT, is made in much larger quantities and is more easily recovered from consumer wastes.

With increasing demand for conserving non-renewable resources and more effectively recycling underutilized scrap PET, improved and less costly processes for deriving PBT from scrap PET materials are sought, in particular if the resulting derived PBT compositions possess desirable physical properties such as tensile and impact strength, and thermal properties. It would be particularly advantageous if the process were compatible with PET blend compositions comprising other polymer components and/or impurities.

The present inventors have observed that biodegradable aliphatic-aromatic copolyester product obtained in the reaction was discolored, often ranging from pink to red in color. This presents a problem in that the aesthetic appearance of a non-white polymer product is an obstacle to employing the polymer in end-uses where the discoloration is apparent and cannot be readily overcome or masked with pigments, whitening agents or fillers.

BRIEF DESCRIPTION OF THE INVENTION

Described herein is a biodegradable aliphatic-aromatic copolyester, comprising: a dihydric alcohol group selected from an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof; an aromatic dicarboxylic acid group derived from a depolymerized aromatic polyester component selected from poly(ethylene terephthalate), poly(butylene terephthalate), poly(trimethylene terephthalate), and combinations thereof, a color reducing compound selected from a $C_{5-12}$ compound having at least three —OH groups, methyl salicylate, and combinations thereof; an adipic acid group; and an aromatic polyester residue selected from an isophthalic acid group, antimony-containing compounds, germanium-containing compounds, cobalt-containing compounds, tin, tin-containing compounds, titanium, aluminum, aluminum salts, alkaline salts, alkaline earth metal salts, phosphorus-containing compounds, sulfur-containing compounds, naphthalene dicarboxylic acid groups, epoxies, and combinations thereof, wherein the aliphatic-aromatic copolyester has a number average molecular weight of at least 20,000 Daltons and a polydispersity index from 2 to less than 6; and wherein the copolyester has a whiteness of at least $L^*=70.0$; $a^*=-8.0$; $b^*=15.0$ as determined using a colorimeter with D65 illumination.

In another embodiment, a composition comprises a biodegradable composition, comprising a combination of: from more than 10 to 59.99 wt. %, based on the total weight of the composition, of the aliphatic-aromatic copolyester; from more than 40 to less than 89.99 wt. %, based on the total weight of the composition, of a polymer selected from aliphatic polyesters, aliphatic polycarbonates, starches, aromatic polyesters, cycloaliphatic polyesters, polyesteramides, aromatic polycarbonates, and combinations thereof; and from 0.01 to 5 wt. %, based on the total weight of the composition, of an additive selected from nucleating agents, antioxidants, UV stabilizers, plasticizers, epoxy compounds, melt strength additives, and combinations thereof; from 0.01 to 45 wt. %, based on the total weight of the composition, of an additive selected from alcohols, acetates, alcohol-acetate copolymers, and combinations thereof; and from 0.01 to 2 wt. %, based on the weight of the composition, of an additive selected from crosslinkers, anti-aging agents, retrogradation agents, anti-blocking agents, water, odor-controlling agents, and combinations thereof.

In still another embodiment a method for making aliphatic-aromatic copolyester is provided, the process comprising depolymerizing the aromatic polyester component, by reacting the aromatic polyester component with a diol component selected from ethylene glycol, 1,2-propylene glycol, 1,3-propylene glycol, 1,2-butanediol, 2,3-butanediol, 1,4-butanediol, tetramethyl cyclobutanediol, isosorbide, 1,3-cyclohexanedimethanol isomers, 1,4-cyclohexanedimethanol isomers, hexylene glycol, bio-derived diols, and combinations thereof, and an adipic acid component selected from adipic acid, adipic acid oligomers, and combinations thereof, in the presence of a color reducing compound selected from a $C_{5-12}$ compound having at least three —OH groups, methyl salicylate, and combinations thereof, in a reactor, at a pressure that is at least atmospheric pressure, at a temperature ranging from 170° C. to 250° C., under an inert atmosphere and with agitation, under conditions sufficient to depolymerize the aromatic polyester component into a molten mixture; and at a temperature from 160° C. to less than 250° C., to form a reaction mixture; and subjecting the reaction mixture to vacuum distillation at a pressure of less than 2 Torr and a temperature of 220 to less than 260° C., to form a molten copolyester.

Articles comprising the above compositions are also disclosed.

These and other features, aspects, and advantages of the present invention will become better understood with reference to the following description and appended claims.

DETAILED DESCRIPTION OF THE INVENTION

Our invention is based on the discovery that it is now possible to produce a biodegradable aliphatic-aromatic copolyester that is white in color from recycled aromatic polyester, such as polyethylene terephthalate, in a process which quenches the polymerization reaction with a color reducing compound selected from a $C_{5-12}$ compound having at least three —OH groups, methyl salicylate, and combinations thereof.

The term "white," as used in this application, means that the material being described as white exhibits an L* value that is at least 70, or at least 80, or at least 85 with a corresponding set of "a" and "b" values that are substantially close to 0, (less than 5 units on the CIE color scale), where the "a" represents red and green hues and "b" represents blue and yellow hues of the white material on the CIE LAB color scale. The L* value can range from 70, or 80, or 85 to 100. The "L*, a, b" method for describing colors is will known and developed by the CIE (Commission Internationale de l'Eclairage). The CIE provides recommendations for colorimetry by specifying the illuminants, the observer and the methodology used to derive values for describing color 3 coordinates are utilized to locate a color in a color space which is represented by L*, a* and b*. When a color is expressed in CIELAB, L* defines lightness, if a value is closer to 0 it means total absorption or how dark a color is. If the L* value is closer to 100 it means total reflection or how light a color is. a* denotes how green or red a color is, whereas b* represents how blue or yellow a color is.

The term "recycle" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

The term "random copolymer," as used in this application refers to a copolymer that includes macromolecules in which the probability of finding a given monomeric unit at any given site in the chain is independent of the nature of the adjacent units.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), and the term "ethylene glycol group" means the group or residue of ethylene glycol having the formula (—O($C_2H_4$)—).

Processes for preparing copolyesters by depolymerizing aromatic polyesters in the presence of polyols are known in the art. For example, U.S. Pat. No. 5,451,611 describes a process for converting waste polyethylene terephthalate to either poly(ethylene-co-butylene terephthalate) or polybutylene terephthalate by reaction with BDO. A principal objective of U.S. Pat. No. 5,451,611 was to provide a process for converting PET waste directly to another high value polymer without breaking down the PET to its constituent monomers or oligomers. The patent discloses numerous examples in which a variety of polymers have a combination of diols incorporated at various ratios of amounts. Example 11 of 5,451,611 patent shows a PBT polymer being formed with a complete replacement of EG by BDO. U.S. Pat. No. 5,266,601 and U.S. Pat. No. 20090275698 (A1) describe a process for making "PBT" from PET by reacting PET with BDO.

The aromatic polyester component from which the aliphatic-aromatic copolyester is made can be in a variety of forms. Generally, in the case of polyethylene terephthalate the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants.

The first dihydric alcohol groups incorporated into the copolyester can be derived from any dihydric alcohol that reacts with the aliphatic dicarboxylic acid and the aromatic polyester to form the first dihydric alcohol group in the copolyester. Examples of suitable dihydric alcohols can include ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. In another embodiment, the dihydric alcohol is selected from 1,4-butanediol, 1,3-propanediol, ethylene glycol, and combinations thereof.

Any of the foregoing dihydric alcohols can be derived from a biological source. In one embodiment all or a portion of the dihydric alcohols are derived from a biological source. "Bio-derived diols" as used herein refers to alcohols other than those named and derived from a biological source, e.g., various pentoses, hexoses, and the like. The first dihydric alcohol is generally added to a mixture containing the aromatic polyester and the aliphatic dicarboxylic acid.

The aromatic dicarboxylic acid group is incorporated into the copolyester when the aromatic polyester reacts with the first dihydric alcohol and the aliphatic dicarboxylic acid under conditions sufficient to form the copolyester. Examples of the aromatic dicarboxylic acid group include isophthalic acid groups, terephthalic acid groups, naphthalic acid groups and a combination thereof. The aromatic dicarboxylic group in the polyester may also be derived from corresponding di($C_1$ to $C_3$) alkyl esters. In a preferred embodiment, the aromatic dicarboxylic acid group is derived from terephthalic acid or di(C1-3)alkyl ester thereof. The aromatic polyester is thus a polyester containing aromatic dicarboxylic acid residues, and can be any aromatic polyester, which when reacted with the first dihydric alcohol and an aliphatic dicarboxylic acid, forms a copolyester containing aromatic dicarboxylic acid groups, first dihydric alcohol groups, and second dihydric alcohol groups.

In one embodiment, the aromatic polyester contains (i) at least 40 mole % of total acid groups as aromatic dicarboxylic acid groups and (ii) is selected from the group consisting of poly(ethylene terephthalate), poly(butylene terephthalate), polypropylene terephthalate, copolymers of the foregoing, and combinations thereof. Specific examples of suitable aromatic polyesters include poly(ethylene terephthalate), poly (butylene terephthalate), polytrimethylene tereptphalate, and combinations thereof. The aromatic polyester can be petroleum-derived or bio-derived, and in one embodiment is a recycled aromatic polyester, for example recycle polyethylene terephthalate). The recycle polyester can be in any form, e.g., flakes, pellets, and the like.

The aliphatic dicarboxylic acid group is incorporated into the copolyester when the aromatic polyester reacts with the first dihydric alcohol and the aliphatic dicarboxylic acid to form the copolyester. Examples of the aliphatic dicarboxylic acid include components having the general formula $(CH_2)_m(COOH)_2$, where m is an integer from 2 to 10. The aliphatic dicarboxylic acid can be decanedioic acid, adipic acid, or sebacic acid. When the aliphatic dicarboxylic acid is adipic acid, the value of m is 4. When the aliphatic dicarboxylic acid is sebacic acid, the value m is 8. In one embodiment all or a portion of the aliphatic dicarboxylic acid is a bio-derived aliphatic dicarboxylic acid.

The aliphatic-aromatic copolyester further comprises a second dihydric alcohol group that is derived from the aromatic polyester, and that is incorporated into the copolyester when the first dihydric alcohol reacts with the aromatic polyester in the presence of the aliphatic dicarboxylic acid. As such, unlike the first dihydric alcohol, the second dihydric alcohol is not added to a mixture containing the polyester and the aliphatic dicarboxylic acid. Examples of suitable second dihydric alcohol groups can include the residues of ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), hexylene glycol, and a combination thereof. Because the second dihydric alcohol groups are derived from the aromatic polyester, the first and the second dihydric alcohol groups can be the same or different. For example, the first dihydric alcohol groups can be residues of 1,4-butanediol, 1,3-propanediol, ethylene glycol, or combinations thereof and the second dihydric alcohol groups can be ethylene glycol, diethylene glycol, 1,3-propanediol, 1,4-butanediol, or combinations thereof. The first dihydric alcohol groups and the second dihydric alcohol groups are the same in one embodiment. The first dihydric alcohol groups and the second dihydric alcohol groups are different in another embodiment.

In a specific embodiment, the first dihydric alcohol is 1,4-butanediol, 1,3-propanediol, ethylene glycol, or a combination thereof the aliphatic dicarboxylic acid is decanedioic acid, adipic acid, sebacic acid, or a combination thereof, the second dihydric alcohol group is the residue of ethylene glycol, 1,3-propanediol, 1,4-butanediol, or a combination thereof, and the aromatic polyester is a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly (ethylene terephthalate), post-consumer poly(ethylene terephthalate), recycled poly(trimethylene terephthalate), recycled copolyesters of terephthalic acid with ethylene glycol and cyclohexane dimethanol, and combinations thereof.

In another embodiment, the aromatic dicarboxylic ester groups comprise the polymerization product of dimethyl terephthalate derived from recycled PET and the dihydric alcohol, and further wherein the copolyester further comprises a dimethyl terephthalate residual composition. Processes for recovering dimethyl terephthalate, also referred to as DMT or the dimethyl ester of terephthalic acid, are known in the art, for example as set forth in U.S. Pat. No. 6,472,557 and other patents disclosed therein, which disclosure is incorporated herein by reference. Typically, the polyethylene terephthalate is reacted at elevated temperature and suitable conditions with an alcohol, such as methanol, to break the ester linkages of the polyester and yield the corresponding diesters of the terephthalic acid, such as dimethyl terephthalate (DMT).

The amount of the first dihydric alcohol group and the second dihydric alcohol group in the copolyester can vary. In one embodiment, the first dihydric alcohol group is present in an amount from 80 to 99.6 mole % of total dihydric alcohol content and the second dihydric alcohol group is present in an amount from 0.4 mole % to 20.0 mole % of the total dihydric alcohol content. In another embodiment, the first dihydric alcohol group is present in an amount from 85 to 99.4 mole % of total content of dihydric alcohol groups in the composition and the second dihydric alcohol group is present in an amount from 0.6 to 15.0 mole % of the total dihydric alcohol content.

The relative amounts of the aromatic dicarboxylic acid group and the aliphatic dicarboxylic acid group can vary. In one embodiment, the aromatic dicarboxylic group and the aliphatic dicarboxylic group have an aromatic dicarboxylic group: aliphatic dicarboxylic group mole ratio from 0.6:1 to 6:1. In another embodiment, the aromatic dicarboxylic group and the aliphatic dicarboxylic group are present at an aromatic dicarboxylic group: aliphatic dicarboxylic group mole ratio from 0.6:1 to 1.3:1.

The content of aromatic acid groups (in particular isophthalic acid groups and terephthalic acid groups) in the copolyester will vary depending on the aromatic polyester used and the reaction conditions. In one embodiment the aromatic dicarboxylic acid group contains from 0.2 to 3.0 mole % of isophthalic acid group and from 47 to 49.8 mole % percent of terephthalic acid groups, based on the total moles of acid groups present in the copolymer.

In a specific embodiment, the first dihydric alcohol group is present in an amount from 80 to 99.6 mole % of the total dihydric alcohol content and the second dihydric alcohol group is present in an amount from 0.4 mole % to 20.0 mole % of the total dihydric alcohol content, the aromatic dicarboxylic group and the aliphatic dicarboxylic group have an aromatic dicarboxylic group:aliphatic dicarboxylic mole ratio from 0.6:1 to 6:1, and the aromatic dicarboxylic acid group contains from 0.2 to 3.0 mole % of isophthalic acid groups and from 47 to 49.8 mole % terephthalic acid groups, each based on the total moles of dicarboxylic acid groups in the copolymer.

The copolyesters can further comprise other residues present in the aromatic polyester, including catalyst residues from the manufacture of the aromatic polyester, residues from additives in the aromatic polyester, or residues arising from side reactions that occur during manufacture of the aromatic polyester and/or the reaction of the first dihydric alcohol, the aliphatic diacid, and the aromatic polyester.

For example, when the aromatic polyester includes a poly (ethylene terephthalate) component, the aromatic polyester can include a poly(ethylene terephthalate) homopolymer, a poly(ethylene terephthalate) copolymer, or a combination thereof, and the aliphatic-aromatic copolyester contains a residue derived from the poly(ethylene terephthalate) composition. Residues derived from the poly(ethylene terephthalate) component can be ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the poly(ethylene terephthalate) component comprises ethylene glycol groups, diethylene glycol groups, and more particularly a combination of ethylene glycol groups, diethylene glycol groups.

Accordingly, in an embodiment, the residue derived from the poly(ethylene terephthalate) component includes individual elements and combinations of the foregoing materials. The residue derived from the poly(ethylene terephthalate) component, for instance, can comprise isophthalic acid groups. In an embodiment, the residue derived from the poly (ethylene terephthalate) component further comprises the cis isomer of 1,3-cyclohexanedimethanol, cis isomer of 1,4-cyclohexanedimethanol, trans isomer of 1,3-cyclohexanedimethanol, trans isomer of 1,4-cyclohexanedimethanol and combinations thereof. In one embodiment, the residue derived from the poly(ethylene terephthalate) component includes a combination of ethylene glycol and diethylene glycol groups, optionally with isophthalic acid groups, and can further comprise the cis isomer of 1,3-cyclohexanedimethanol, the cis isomer of 1,4-cyclohexanedimethanol, the trans isomer of 1,3-cyclohexanedimethanol, trans isomer of 1,4-cyclohexanedimethanol, or combinations thereof. In an embodiment, the residue derived from the polyethylene terephthalate component comprises ethylene glycol groups, diethylene glycol groups, isophthalic acid groups, the cis isomer of cyclohexanedimethanol, the trans isomer of cyclohexanedimethanol, and combinations thereof. In an embodiment, the residue derived from the poly(ethylene terephthalate) component comprises ethylene glycol groups, diethylene glycol groups, and cobalt-containing compounds; in another embodiment the a residue derived from the poly (ethylene terephthalate) component further comprises isophthalic acid groups.

When the aromatic polyester is poly(butylene terephthalate), the composition can contain poly(butylene terephthalate) residues such as butane diol, titanium, tin, or combinations thereof, optionally together with epoxies.

When the aromatic polyester is poly(trimethylene terephthalate), the composition contains poly(trimethylene terephthalate) residues such as propane diol, titanium, tin, or combinations thereof.

The processes and compositions according to the invention include a color-reducing amount of a $C_{5-12}$ compound having at least three hydroxyl groups, at least one hydroxyl group and two carboxylic acid groups, or at least two hydroxy groups and one carboxylic acid group.

Preferably, the color-reducing compound is selected from sorbitol, mannitol, xylitol, pentaerythritol, ascorbic acid, malic acid, methyl salicylate, and combinations thereof. In another embodiment, the color-reducing polyol is selected from sorbitol, mannitol, and combinations thereof.

The copolyester generally has a number average molecular weight of at least 20,000 Daltons and a polydispersity index from 2 to less than 6, specifically 2 to 5. In one embodiment, the copolyester has a glass transition temperature (Tg) from −35° C. to 0° C. In another embodiment, the copolyester has a melting temperature (Tm) from 90° C. to 160° C.

The copolyester can be made by any suitable method using the aromatic polyester, the first dihydric alcohol, and the aliphatic diacid. In one embodiment, the copolyester is manufactured by reacting the aromatic polyester with the first dihydric alcohol and the aliphatic dicarboxylic acid at an elevated temperature in the presence of a transition metal catalyst, to form a first mixture, and subjecting the first mixture to a reduced pressure and an elevated temperature to form the copolyester.

The copolyester can also be made with additional materials that can be present during any of the manufacturing steps, or added after formation of the molten copolyester, or after cooling of the molten copolyester.

In another optional embodiment, the molten copolyester is further reacted with an addition copolymer comprising the residue of an epoxy compound, such as bisphenol A epoxy or a glycidyl ester monomer for an effective time, for example at least 5 minutes, specifically from 5 minutes to two hours. In this embodiment, the aliphatic-aromatic copolyester further comprises a residue of the addition copolymer, either associated with the copolymer or covalently bound to the copolymer. Examples of the an addition copolymer based on an epoxy compound, such as bisphenol A epoxy or a glycidyl monomer include an addition copolymer comprising the residue of bisphenol A epoxy, glycidyl acrylate, glycidyl methacrylate, or a combination thereof and the residue of methyl methacrylate, methyl acrylate, styrene, alpha-methyl styrene, butyl methacrylate butyl acrylate, or combinations thereof, for example styrene and methyl methacrylate. The addition copolymer can be present in an amount from 0 to 1.50 wt. % of the molten copolyester. Reacting can be at a temperature of, for example, less than or equal to 250° C.

In a specific embodiment, the molten copolyester is further reacted with the phosphate compound and the addition polymer, thereby providing the copolymer with a residue of the phosphate compound and a residue of the addition copolymer. Thus, the copolyester is manufactured by: a) reacting an aromatic polyester with a first dihydric alcohol and an aliphatic dicarboxylic acid at a temperature from 160° C. to less than 250° C. in the presence of a titanium alkoxide catalyst, to form a first mixture, wherein the dihydric alcohol is ethylene glycol, propylene glycol, butylene glycol, 1,4-butanediol tetramethyl cyclobutanediol, isosorbide, cyclohexanedimethanol, a bio-derived diol, or hexylene glycol and wherein the aliphatic dicarboxylic acid is of the general formula $(CH_2)m(COOH)_2$, wherein m=4 to 10; (b) subjecting the first mixture to a pressure of less than 2 Torr, e.g., by vacuum distillation, and a temperature of 220 to less than 260° C. to form the copolyester; and thereby forming the copolyester. Reacting can be at a temperature of, for example, less than or equal to 250° C.

The biodegradable composition includes, in addition to the copolyester, other components combined with the copolyester, for example other polymers and additives, for example additives used in the formulation of molding compositions. Examples of the polymers include aliphatic polyesters, aromatic polycarbonates, aliphatic polycarbonates, starches, aromatic polyesters, cycloaliphatic polyesters, polyesteramides, combinations thereof, and the like. The polymers can be wholly or partially bio-derived, including petroleum-derived aromatic polyesters and bio-derived aromatic polyesters. In the art, chain extenders such as epoxides, bisoxazolines, bis-caprolactams, dianhydrides, etc. have been reported for use in polyesters. Among these, epoxides are most widely used on a commercial scale due to their relatively low cost and availability of a variety of structures.

In a specific embodiment the copolyester is combined with an aliphatic polyester, for example poly(lactic acid), poly(hydroxyalkanoate), poly(butylene succinate), poly(butylene adipate), poly(butylene succinate adipate) and poly(caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another specific embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives, for example a polymer can vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt % and the amount of polylactic acid can range from 10 to 60 wt %, specifically 40 to 60%, based on the total weight of the composition.

The composition may also contain from 0.01 to 45 wt. %, based on the total weight of the composition, of an additive selected from alcohols, acetates, alcohol-acetate copolymers, and combinations thereof. Additionally, the composition may contain from 0.01 to 2 wt. %, based on the weight of the composition, of an additive selected from crosslinkers, anti-aging agents, retrogradation agents, anti-blocking agents, water, odor-controlling agents, and combinations thereof.

Additives ordinarily incorporated into polymer compositions can be used, with the proviso that the additives are selected so as to not significantly adversely affect the desired properties of the composition, for example, biodegradability, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, our copolyesters (and compositions containing copolyesters) exhibit a biodegradation (measured in % of solid carbon of the test item that is converted into gaseous, mineral C in the form of $CO_2$), which is at least 30% after 75 days. In one embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, extrusion molded, blow molded, solvent cast or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

As stated above, various combinations of the foregoing embodiments can be used.

The invention is further described in the following illustrative examples in which all parts and percentages are by weight unless otherwise indicated.

EXAMPLES

Following is a list of materials, acronyms, and selected sources used in the examples.
ADA: Adipic Acid (from INVISTA)
   BDO: 1,4-Butanediol (from BASF, with a purity specification of 99.5 wt. %)
   D-mannitol: D-mannitol (from Aldrich)
   D-sorbitol: D-Sorbitol (from Aldrich)
   Methyl salicylate: methyl salicylate (from Aldrich)

TPT: Tetraisopropyl titanate (from DuPont, commercial Tyzor grade)
PBT-co-adipate: Poly(butylene terephthalate)-co-adipate
PET: Poly(ethylene terephthalate)
Recycle PET: Recycle PET in the form of flakes or pellets was obtained from a commercial vendor headquartered in India.

Comparative Example A and Examples 1-7

The purpose of Comparative Example A and Examples 1-7 was to manufacture PBT-co-adipate derived from PET, 1,4-butanediol (BDO), and adipic acid (ADA) in accordance with the invention on a laboratory scale. The materials, amounts, and reaction conditions are shown in Table 1.

TABLE 1

Materials and Conditions for Comparative Example A & Examples 1-7

| Ex. No. | Scale of Reaction (g) | PET:BDO (mol/mol) | ADA:BDO (mol/mol) | Ti (ppm) | EI Temp. (°C.) | EI Time (min) | Poly Temp. (°C.) | Poly Time (min) |
|---|---|---|---|---|---|---|---|---|
| A* | 143 | 0.39 | 0.39 | 250 | 220 | 32 | 250 | 29 |
| 1 | 143 | 0.39 | 0.39 | 250 | 220 | 34 | 230 | 64 |
| 2 | 143 | 0.39 | 0.39 | 250 | 220 | 31 | 230 | 51 |
| 3 | 143 | 0.39 | 0.39 | 250 | 220 | 28 | 250 | 38 |
| 4 | 143 | 0.39 | 0.39 | 250 | 220 | 36 | 250 | 36 |
| 5 | 143 | 0.39 | 0.39 | 125 | 220 | 42 | 250 | 28 |
| 6 | 143 | 0.39 | 0.39 | 65 | 220 | 38 | 250 | 63 |
| 7 | 143 | 0.39 | 0.39 | 33 | 220 | 40 | 250 | 45 |

*Comparative Example

Techniques and Procedures

Comparative Example A

The polyester PBT-co-adipate (Comparative Example A) was prepared as a comparative without using an additive. Accordingly, 48 g of recycle PET, 36.5 g of ADA and 58 g of BDO were introduced into a three neck round bottom flask. The reactor was placed in an oil bath, the temperature of which was adjusted to 170° C. Next, 250 ppm of tetraisopropyl titanate (TPT) was added to the reaction mixture and the ester interchange ("EI" in Table 1) temperature was increased to 220° C. at a rate of 2° C./min while stirring at 260 rpm under nitrogen. The evolved water/ethylene glycol mixture was collected separately. The temperature of the reaction mixture was further increased to 250° C. to melt the residual PET flakes completely. The reactor temperature was hold at 250° C. and the polymerization ("Poly" in Table 1) was initiated with the vacuum adjusted to below 1 Torr for 30 minutes. At the end of the polymerization, the vacuum was released. The resulting polymer exhibited red color.

Examples 1-2

The polyester PBT-co-adipate (Examples 1-2) was prepared using different catalyst quenchers. Accordingly, 48 g of recycle PET, 36.5 g of ADA and 58 g of BDO were introduced into a three neck round bottom flask. The reactor was placed in an oil bath, the temperature of which was adjusted to 170° C. Next, 250 ppm of TPT was added to the reaction mixture and the ester interchange ("EI" in Table 1) temperature was increased to 220° C. at a rate of 2° C./min while stirring at 260 rpm under nitrogen. The evolved water/ethylene glycol mixture was collected separately. The temperature of the reaction mixture was further increased to 250° C. to melt the residual PET flakes completely. The reactor temperature was then decreased to 230° C. and the polymerization ("Poly" in Table 1) was initiated with the vacuum adjusted to below 1 Torr for 1 hour. At the end of the polymerization, the vacuum was released.

In Example 1, 300 ppm of D-mannitol was added at the end of polymerization to the melt and the mixture was agitated for 6 minutes under nitrogen.

In Example 2, 300 ppm of D-sorbitol was added at the end of polymerization to the melt and the mixture was agitated for 6 minutes under nitrogen.

Examples 3-4

The purpose of Examples 3-4 was to determine the effect of a higher polymerization temperature (250° C.) and polyol concentration on the final color of the polymer. Accordingly, PBT-co-adipate (Examples 3-4) was synthesized as described for Examples 1-2, except at the polymerization temperature of 250° C. with the vacuum adjusted to below 1 Torr. At the end of the polymerization, the vacuum was released.

In Example 3, 450 ppm of D-mannitol was added at the end of polymerization to the melt and the mixture was agitated for 6 minutes under nitrogen.

In Example 4, 600 ppm of D-mannitol was added at the end of polymerization to the melt and the mixture was agitated for 6 minutes under nitrogen.

Examples 5-7

The purpose of Examples 5-7 was to demonstrate the effect of the catalyst concentration on the polymerization. The PBT-co-adipate (Examples 5-7) was synthesized as described for Examples 2-3, except that a catalyst concentration of 125, 66, and 33 ppm was used, and the polymerization temperature was at 250° C. At the end of each polymerization, 600 ppm of D-mannitol was added to the melt at the end of polymerization and the mixture was agitated for 6 minutes under nitrogen.

Results

Table 2 shows the glass transition temperature ($T_g$), melting temperature ($T_m$) obtained from DSC, molecular weight data obtained from gel permeation chromatography (GPC), intrinsic viscosity (I.V.), color (L*, a*, b* values obtained through the diffuse reflectance method acquired on a Gretag Macbeth Color-Eye 7000A with D65 illumination) of Comparative Example A and Examples 1-7.

TABLE 2

| Ex. No. | Quencher | Quencher Amount (ppm) | IV (dL/min) | $T_m$ (°C.) | $T_g$ (°C.) | PDI | Mn | Mw | L* | a* | b* |
|---|---|---|---|---|---|---|---|---|---|---|---|
| A* | No | 0 | 1.00 | 116 | −24 | 4.6 | 27500 | 125000 | 62.0 | 12.2 | 13.6 |
| 1 | D-Mannitol | 300 | 1.05 | 110 | −25 | 2.9 | 34000 | 99000 | 77.7 | −2.7 | 3.9 |
| 2 | D-Sorbitol | 300 | 1.12 | 128 | −28 | 3.0 | 37000 | 111000 | 81.7 | −4.5 | 7.5 |
| 3 | D-Mannitol | 450 | 1.16 | 115 | −25 | 3.1 | 37000 | 112000 | 78.0 | −7.9 | 14.9 |
| 4 | D-Mannitol | 600 | 1.11 | 122 | −26 | 3.1 | 35000 | 108000 | 77.6 | −7.7 | 21.8 |
| 5 | D-Mannitol | 600 | 1.03 | 121 | −28 | 3.0 | 33000 | 98000 | 79.8 | −5.1 | 7.3 |
| 6 | D-Mannitol | 600 | 1.07 | 122 | −28 | 3.2 | 31000 | 99000 | 78.7 | −8.4 | 10.0 |
| 7 | D-Mannitol | 600 | 1.14 | 122 | −28 | 3.9 | 29000 | 112000 | 71.2 | 1.1 | 9.5 |

*Comparative

Discussion

EP 02 72417 teaches the use of polyols as a color stabilizer for copolyester compositions, in particular that various polyols having a formula of $R—(OH)_x$ can be used to quench titanium catalyst, leading to white copolyesters. In Examples 1-2, D-mannitol and D-sorbitol were used to quench titanium catalyst in the copolyester melt after polymerization at 230° C. Without being bound by theory, it is believed that because the pKa values of D-mannitol and D-sorbitol are close to 7, the molecular weight degradation of the polymer due to the hydrolysis was prevented. As shown in Table 2, the use of polyol quenchers in the current process provides a white copolyester while maintaining the molecular weight of the copolyester.

However, as shown by Examples 3-4, after polymerization at 250° C., a yellow coloration was observed. Increasing the polyol concentration in the quenching process did not have any effect on the elimination of the yellow color. Again without being bound by theory, it is believed that this can be explained by thermal degradation of the copolyester by hydrogen abstraction from a methylene carbon at the higher polymerization temperature, leading to double bond formation which complexes with titanium catalyst.

Moreover, it was found that a high amount of TPT can catalyze the degradation and complexation reactions during the polymerization stage. When the TPT amount in the formulation was reduced (Examples 5-6), a copolyester with a white color was achieved. This supports a strong correlation between the catalyst concentration and the final color of the copolyester.

The molecular weights and melting temperature of Examples 1-7 are similar to those of the commercially available PBT-co-adipate. However, the polydispersity of resulting copolyesters are lower compared to the commercially available PBT-co-adipate.

Example 8

The purpose of Examples 8 was to manufacture PBT-co-adipate derived from PET, 1,4-butanediol (BDO), and adipic acid (ADA) in accordance with the invention on a laboratory scale using methyl salicylate as an organic quencher. The materials, amounts, and reaction conditions are shown in Table 3.

TABLE 3

| | Materials and Conditions for Example 8 | | | | | | | |
|---|---|---|---|---|---|---|---|---|
| Ex. No. | Scale of Reaction (g) | PET:BDO (mol/mol) | ADA:BDO (mol/mol) | Ti (ppm) | EI Temp. (°C.) | EI Time (min) | Poly Temp. (°C.) | Poly Time (min) |
| 8 | 143 | 0.39 | 0.39 | 250 | 220 | 35 | 250 | 40 |

The purpose of Example 8 was to determine the effect of a higher polymerization temperature (250° C.) and polyol concentration on the final color of the polymer. Accordingly, PBT-co-adipate (Example 8) was synthesized as described for Examples 1-2, except at the polymerization temperature of 250° C. with the vacuum adjusted to below 1 Torr. At the end of the polymerization, the vacuum was released and 450 ppm of methyl salicylate was added at the end of polymerization to the melt and the mixture was agitated for 6 minutes under nitrogen.

Results

Table 4 shows the glass transition temperature ($T_g$), melting temperature ($T_m$) obtained from DSC, molecular weight data obtained from gel permeation chromatography (GPC), intrinsic viscosity (I.V.), color (L*, a*, b* values obtained through the diffuse reflectance method acquired on a Gretag Macbeth Color-Eye 7000A with D65 illumination) of Example 8.

TABLE 4

Results for Example 98

| Ex. No. | Quencher | Quencher Amount (ppm) | IV (dL/min) | $T_m$ (° C.) | $T_g$ (° C.) | PDI | Mn | Mw | L* | a* | b* |
|---|---|---|---|---|---|---|---|---|---|---|---|
| 9 | Methyl Salicylate | 450 | 0.67 | 117 | −28 | 3.1 | 13000 | 125000 | 69.8 | 17.7 | 37.0 |

Discussion

Example 8 shows that methyl salicylate can be used as catalyst quencher. This quencher removes color from the resin body All cited patents, patent applications, and other references are incorporated herein by reference in their entirety.

Although the present invention has been described in detail with reference to certain preferred versions thereof, other variations are possible. Therefore, the spirit and scope of the appended claims should not be limited to the description of the versions contained therein.

What is claimed is:

1. A copolyester composition comprising a biodegradable aliphatic-aromatic copolyester that comprises:
   (a) a dihydric alcohol group selected from an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof;
   (b) an aromatic dicarboxylic acid group derived from a depolymerized aromatic polyester component selected from poly(ethylene terephthalate), poly(butylene terephthalate), poly(trimethylene terephthalate), and combinations thereof; and
   (c) an adipic acid group; wherein the composition further comprises
   (d) a titanium-containing catalyst;
   (e) an aromatic polyester residue selected from an isophthalic acid group, antimony-containing compounds, germanium-containing compounds, cobalt-containing compounds, tin, tin-containing compounds, titanium, aluminum, aluminum salts, alkaline salts, alkaline earth metal salts, phosphorous-containing compounds, sulfur-containing compounds, naphthalene dicarboxylic acid groups, epoxies, and combinations thereof; and
   (f) a color reducing compound selected from $C_{5-12}$ compounds having at least three —OH groups and combinations thereof;
   wherein the aliphatic-aromatic copolyester has a number average molecular weight of at least 20,000 Daltons and a polydispersity index from 2 to less than 6;
   wherein the copolyester composition is made by a process comprising adding the color reducing compound to the copolyester melt to obtain a whiteness of at least L*=70.0; a*=−8.0; b*=15.0 as determined using a colorimeter with D65 illumination; and
   wherein polycarbonate is absent from the copolyester composition.

2. The copolyester composition of claim 1, wherein the dihydric alcohol group is selected from a 1,4-butanediol group, 1,3-propanediol group, ethylene glycol group, or combinations thereof.

3. The copolyester composition of claim 1, wherein the aromatic dicarboxylic acid group is derived from a depolymerized polyester component selected from poly(trimethylene terephthalate)s derived from petroleum-derived 1,3-propanediol, poly(trimethylene terephthalate)s derived from bio-derived 1,3-propanediol, poly(butylene terephthalate)s derived from petroleum-derived 1,4-butanediol, poly(butylene terephthalate)s derived from bio-derived 1,4-butanediol, poly(trimethylene terephthalate)s derived from post-consumer poly(ethylene terephthalate)s, poly(butylene terephthalate)s derived from post-consumer poly(ethylene terephthalate)s, virgin poly(ethylene terephthalate)s, recycled poly (ethylene terephthalate) s, post-consumer poly(ethylene terephthalate) s, recycled poly(trimethylene terephthalate)s, recycled copolyesters of terephthalic acid with ethylene glycol and cyclohexane dimethanol, and combinations thereof.

4. The copolyester composition of claim 1, wherein
   the aromatic dicarboxylic acid group is derived from depolymerized poly(butylene terephthalate), and
   the aromatic polyester residue is selected from titanium, titanium-containing compounds, tin, tin-containing compounds, epoxies, and combinations thereof.

5. The copolyester composition of claim 1, wherein
   the aromatic dicarboxylic acid group is derived from depolymerized poly(trimethylene terephthalate) and
   the aromatic polyester residue is selected from titanium, tin, epoxies, and combinations thereof.

6. The copolyester composition of claim 1, wherein
   the aromatic dicarboxylic acid group is derived from depolymerized poly(ethylene terephthalate) homopolymer, copolymers of poly(ethylene terephthalate), or combinations thereof, and
   the aromatic polyester residue is selected from an isophthalic acid group, antimony-containing compounds, germanium-containing compounds, cobalt-containing compounds, tin-containing compounds, aluminum, aluminum salts, alkaline salts, alkaline earth metal salts, phosphorus-containing compounds, sulfur-containing compounds, naphthalene dicarboxylic acid groups, and combinations thereof.

7. The copolyester composition of claim 6, wherein the dihydric alcohol group is selected from mixtures containing ethylene glycol groups and one or more diethylene glycol groups, a cis isomer of a 1,3-cyclohexanedimethanol group, cis isomer of 1,4-cyclohexanedimethanol group, trans isomer of 1,3-cyclohexanedimethanol group, trans isomer of 1,4-cyclohexanedimethanol group, and combinations thereof.

8. The copolyester composition of claim 6, wherein the aromatic polyester residue further comprises an isophthalic acid group.

9. The copolyester composition of claim 1, wherein the color-reducing compound is a $C_{5-12}$ compound having at least three hydroxyl groups, at least one hydroxyl group and two carboxylic acid groups, or at least two hydroxy groups and one carboxylic acid group.

10. The copolyester composition of claim 1, wherein the color-reducing compound is selected from sorbitol, mannitol, xylitol, pentaerythritol, ascorbic acid, malic acid, methyl salicylate, and combinations thereof.

11. The copolyester composition of claim 1, wherein the color-reducing polyol is selected from sorbitol, mannitol, and combinations thereof.

12. The copolyester composition of claim 1, further comprising a residue of an epoxy compound selected from a glycidyl methacrylate copolymer, a bisphenol A epoxy, and combinations thereof.

13. The copolyester composition of claim 11, having a $T_g$ from −35° C. to 0° C. and a $T_m$ from 90° C. to 160° C.

14. A biodegradable composition, comprising a combination of:
(i) from more than 10 to 59.99 wt. %, based on the total weight of the composition, of the aliphatic aromatic copolyester composition of claim 1;
(ii) from more than 40 to less than 89.99 wt. %, based on the total weight of the composition, of a polymer selected from aliphatic polyesters, aromatic polyesters, and combinations thereof; and
(iii) from 0.01 to 5 wt. %, based on the total weight of the composition, of an additive selected from nucleating agents, antioxidants, UV stabilizers, plasticizers, epoxy compounds, melt strength additives, and combinations thereof;
(iv) from 0.01 to 45 wt. %, based on the total weight of the composition, of an additive selected from alcohols, acetates, alcohol-acetate copolymers, and combinations thereof; and
(v) from 0.01 to 2 wt. %, based on the weight of the composition, of an additive selected from crosslinkers, anti-aging agents, retrogradation agents, anti-blocking agents, water, odor-controlling agents, and combinations thereof.

15. The composition of claim 14, wherein the aliphatic polyester is selected from poly(lactic acid)s, poly(hydroxyalkanoate)s, poly(butylene succinate)s, poly(butylene adipate)s, poly(butylene succinate adipate)s, poly(caprolactone)s, and combinations thereof.

16. An article extruded, calendared, extrusion molded, blow molded, solvent cast or injection molded from the biodegradable composition of claim 14.

17. The article of claim 16, wherein the article is a film.

18. The film of claim 17, wherein the film is formed by extrusion molding or calendaring the biodegradable composition.

19. A copolyester composition comprising a biodegradable aliphatic-aromatic copolyester that comprises:
(a) a dihydric alcohol group, derived from a dihydric alcohol, selected from an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof;
(b) an aromatic dicarboxylic acid group derived from a depolymerized aromatic polyester component selected from poly(ethylene terephthalate), poly(butylene terephthalate), poly(trimethylene terephthalate), and combinations thereof; and
(c) an adipic acid group derived from adipic acid, adipic acid oligomers, or combinations thereof; wherein the copolyester composition further comprises:
(d) a titanium-containing catalyst;
(e) an aromatic polyester residue selected from an isophthalic acid group, antimony-containing compounds, germanium-containing compounds, cobalt-containing compounds, tin, tin-containing compounds, titanium, aluminum, aluminum salts, alkaline salts, alkaline earth metal salts, phosphorous-containing compounds, sulfur-containing compounds, naphthalene dicarboxylic acid groups, epoxies, and combinations thereof; and
(f) a color reducing compound selected from $C_{5-12}$ compounds having at least three —OH groups and combinations thereof;
wherein the aliphatic-aromatic copolyester has a number average molecular weight of at least 20,000 Daltons and a polydispersity index from 2 to less than 6;
wherein the copolyester has a whiteness of at least L*=70.0; a*=−8.0; b*=15.0 as determined using a colorimeter with D65 illumination; and
wherein the composition comprises a polymerization reaction product in which the copolyester has been formed, and wherein the copolyester is not combined with another polymer.

20. The copolyester composition of claim 19, wherein the composition is the product of a process comprising combining the color reducing compound with said copolyester in molten form to obtain a mixture and subsequently cooling the mixture to obtain the copolyester composition, wherein the copolyester composition comprises a polymer consisting of said copolyester.

21. The copolyester composition of claim 20, wherein the color reducing compound is selected from the group consisting of mannitol, sorbitol, and combinations thereof.

22. The copolyester composition of claim 21, wherein the color reducing
compound is present in an amount such that, compared to its absence, the copolyester composition obtains the whiteness of exhibits said whiteness of at least L*=70.0; a*=−8.0; and
b*=15.0 as determined using a colorimeter with D65 illumination.

* * * * *